United States Patent Office 3,490,288
Patented Jan. 20, 1970

3,490,288
METHOD AND APPARATUS FOR
SAMPLING SOIL GAS
Homer Whitman Patnode, Gibsonia, Pa., assignor to Gulf
Research & Development Company, Pittsburgh, Pa., a
corporation of Delaware
Filed Dec. 28, 1967, Ser. No. 694,230
Int. Cl. G01n 1/22
U.S. Cl. 73—421.5                                    13 Claims

ABSTRACT OF THE DISCLOSURE

A soil gas sampler is inserted in a hole that terminates just short of the target depth. The sampler is driven to the target depth and then withdrawn a predetermined distance to create a solids-free space. A needle attached to a capillary tube punctures a resealable septum in the end of the sampler so that the needle enters the solids-free space to obtain a sample of soil gas.

---

Figures 1, 2, 3:
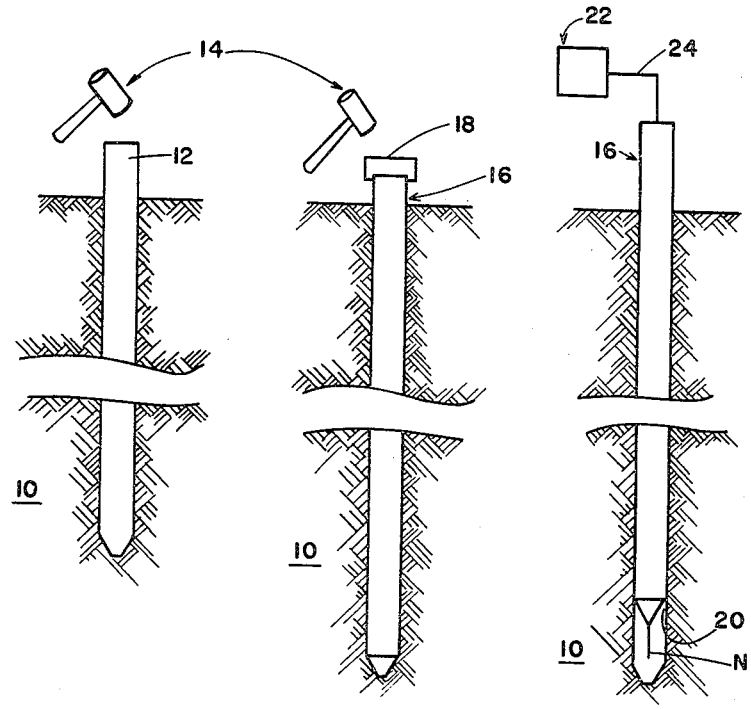

This invention relates generally to the field of Geochemistry and more particularly is directed to a method and apparatus for taking samples of gases at relatively shallow depths in the earth.

The knowledge of whether or not such gas is present is useful in several fields. In exploring for petroliferous deposits, the presence of certain gases is one indicator of possible accumulations of hydrocarbons deeper in the earth. The theory is that gas will leak off the accumulations and will migrate towards the surface. Another general field of use for the method and apparatus of the invention is as a gas detector in commercial applications. For example, the invention may be employed by utility companies as a means to detect leakage from underground gas pipes. Another application comprises a monitoring function wherein the apparatus of the invention is emplaced in a pseudo-permanent location next to a critical point in a pipeline or other gas carrying vessel to constantly monitor the vessel for gas leaks.

The invention comprises a soil gas sampler which includes a hollow needle which is inserted in a solids-free space created in the soil by the method of the invention to sample gases that may be present in said space. The needle employed in the embodiment of the invention which has been successfully built and used is a standard hypodermic needle for use with a syringe in medical applications. The needle is connected to and has its central opening in communication with a capillary tube housed within the body of the sampler, and means are provided to seal the upper end of the tube to prevent contamination until the needle is inserted in the space in the soil from which gas is to be collected. The lower end of the body is sealed by a septum which may be repeatedly pierced by the needle, and which will reseal itself after each such use to prevent the entry of fluids and solids into the sampler.

The method of the invention usually includes the creation of a pilot hole, for example, with the use of a solid steel rod having an outside shape substantially the same as the outside shape of the body of the tool. This rod may be driven into the ground by any suitable means, such as with a sledge hammer, to a depth short of the final target depth at which it is desired to sample soil gas. The pilot rod is then removed, and the sampler of the invention inserted into the hole. The sampler is then driven to final depth. The use of the pilot rod to create most of the hole is desirable to lengthen the life of the sampler. However, the pilot hole may be omitted where certain types of soils are to be traversed. In any case, by creating at least the lower part of the hole with the sampler, the air tightness of the seal around the sampler at target depth is improved. The sampler is then withdrawn from the hole a relatively short distance, on the order of an inch, or two, to create a contamination and solids-free space below the bottom of the sampler. The needle housed within the sampler body is then pushed through the rubber septum at the bottom of the tool so that its lower open end is located within the space. Means is provided to communicate the upper end of a capillary tube, which carries the needle, to suitable subsequent equipment, such as a chromatographic column, and/or a vacuum pump to actually sample and further handle the gas. Once sampling is completed, the needle is retracted through the septum back into the sampler which is then withdrawn from the hole for reuse.

The invention has several advantages over and solves several problems present in prior known soil gas samplers. Most such prior samplers locate the gas gathering ports or other gas passages in intimate relation with the soil. This feature of such prior samplers is highly undesirable because solids, such as sand grains or the like, tend to enter the tool and foul the gas handling portions. Another disadvantage of intimate contact between the gas entry means and the soil is that such ports, orifices, or the like, may be easily plugged, such as by small particles carried by the flow of gas, or by the happenstance of the ports or the like encountering a small pebble, a moist clod of earth, or other disruptive element. The present invention solves all of these problems and achieves the advantage of more consistently reliable operation over such prior intimate contact types of sampler by the provision of the space created by the method of the invention below the sampler into which the sampling means, the hollow needle, is inserted.

Other prior known samplers attempt to locate the gas gathering ports, orifices, or the like within a space and not in intimate contact with the soil by providing segmented tools of various kinds having portions that move, one with respect to the other, or by providing an enlarged nosepiece which creates a hole having a larger cross-sectional area than the cross-sectional area of the tool at which the ports or the like are located. Such prior devices may be successful in avoiding the flow of solids into the tool, but they suffer from a different disadvantage involving retraction of the tool. Since the gas gathering ports or the like must move through the soil when the tool is withdrawn, at least a good possibility of fouling or clogging of the ports or the like, and/or contamination of the samples by air or other random gases is created. The present invention solves these problems by the provision of the hollow needle as the gas sampling means, in cooperation with the resealable rubber septum at the lower end of the tube through which the needle is inserted into the sampling space and then retracted into the tool for withdrawal. A wiping of the needle by the septum occurs during retraction. In some prior samplers, relatively large elements of the tool move, and such motion can trap particles and the like between such elements.

Thus, the apparatus of the invention is very "clean" in operation in that the gas gathering means are always housed within the sampler body except when a sample is actually being taken. During all times when the sampler is being moved the gas gathering needle is housed within the body whose lower end is sealed against contamination by the septum. Thus, the present invention achieves the advantage of highly reliable and simple operation and totally eliminates clean-up operations between samplings that prior known samplers required.

Figure 4:
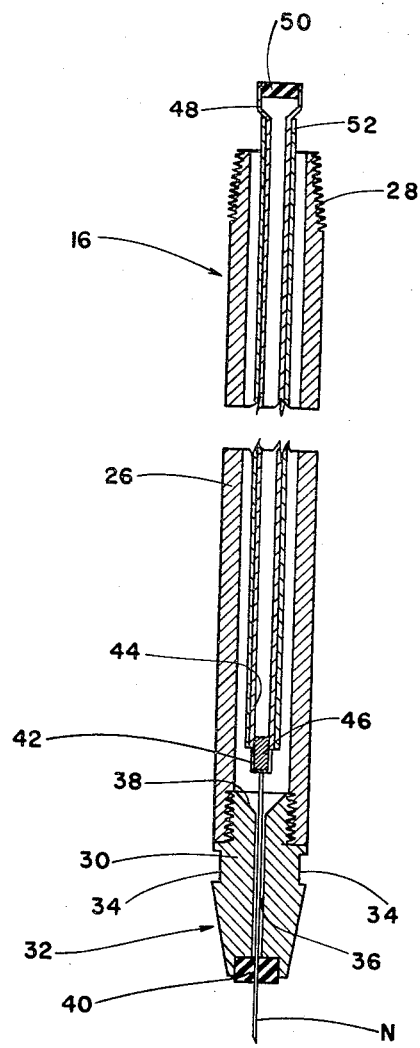

The above and other advantages of the invention will be pointed out or will become evident in the following detailed description and claims, and in the accompanying drawing also forming a part of the disclosure, in which: FIGS. 1, 2 and 3 are a series of diagrammatic drawings illustrating the steps of the method of the invention and FIG. 4 is a longitudinal cross-sectional view of a sampler embodying the invention.

Referring now in detail to the drawing, 10 designates a region of the earth from which it is desired to take a gas sample. FIGS. 1 through 3 are diagrams illustrating the successive steps in the method of the invention. In FIG. 1, a pilot rod 12 is being driven to a depth in region 10 just short of final target depth by any suitable means generally indicated by sledge hammer 14. In FIG. 2, pilot rod 12 has been removed, and a gas sampler 16 is being driven to final target depth by any suitable means again indicated by sledge hammer 14. For this step, the upper end of sampler 16 is provided with a suitable protective cap 18. In FIG. 3, sampler 16 has been slightly withdrawn from the bottom of hole 20, and needle N has been located in the space within the hole below sampler 16. Protective cap 18 has been removed, and a suitable gas collector and/or analyzer 22 has been operatively connected to needle N by a suitable conduit 24.

As shown in the above described figures, the method of the invention comprises driving the pilot rod to a depth just short of final depth, removing the pilot rod and driving the sampler the remaining distance to target depth, withdrawing the sampler a short distance to create a solids-free space below the the sampler, inserting the gas sampling needle into the solids-free space thus created, and taking a gas sample. After the gas has been sampled, the needle N is retracted into the body of the sampler 16 and it is rapidly and without concern for contamination withdrawn from the hole 20 and is, without any further steps, ready for reuse.

The use of pilot rod 12 is desirable in substantially all applications since the length of hole 20 required will usually be on the order of six to eight feet, and it is likely that some resistance, a hard packed formation, pebbles, or other such elements in the soil will be encountered which could damage sampler 16 if it were used to create the entire hole. However, in some cases where no such disruptive elements are present, for example in said, or other relatively low resistance formations, it will not be necessary to first create a pilot hole by use of rod 12, and sampler 16 may be safely used to create the entire hole.

Referring now to FIG. 4, the preferred embodiment of sampler 16 is shown in detail. The body of the sampler comprises a steel pipe 26 which is sufficiently long to reach to the desired depths, which has an outside diameter as small as possible but large enough to house the remaining apparatus and strong enough to support itself and to withstand the force necessary to drive it. In the successful embodiment, pipe 26 has a diameter of about 5/8 inch and a length of about 7 feet. Samples embodying the invention may be made with dimensions in the range of about 6 feet to about 15 feet in length, and about 5/8 inch to about 1¼ inches in diameter In the larger lengths, it may be convenient to attach extensions to a shorter pipe 26 and capillary tube structure, rather than to fabricate one long tool which may be difficult to drive.

The upper end of pipe 26 is threaded as at 28 for reception of an extension or the protective cap 18 shown diagrammatically in FIG. 2. Cap 18 may comprise a standard pipe cap, and is therefore not shown in detail in FIG. 4. The lower end of pipe 26 is internally threaded to receive the threaded upper end 30 of a nosepiece 32. Nosepiece 32 is formed with a plurality of wrench flats 34, two of which are shown in FIG. 4, or other suitable means to tighten it to the lower end of pipe 26. A central longitudinal passageway 36 is formed in nosepiece 32, for free sliding reception of the needle N therethrough. The upper end of passageway 36 flares upwardly and outwardly as at 38 to guide the tip of the needle N into the passageway 36 when it is desired to move the needle into its operative position. Nosepiece 32 is formed with a suitable cavity at its lower end which sealingly receives lower septum 40. Septum 40 is formed of any suitable natural or synthetic rubber, such as the kinds used in gas chromatogrophy and the pharmaceutical industry to seal vials or the like of liquids, serums, etc., intended to be administered by means of a hypodermic syringe. Septum 40 will permit repeated passage of the needle N therethrough and will reseal itself, fluid-tight, after each withdrawal of the needle back into pipe 26. In the embodiment which has been built and successfully used, spetum 40 has dimensions of about 1/8 inch thick and about 3/8 inch in diameter, and has successfully resealed itself many times. The septums are easily replaced wherever the sampler is out of the ground, as required.

An adapter member 42 connects the upper end of needle N to the lower end of a capillary tube 44. Filter means 46 is housed within adapter 42 to protect the system above the needle against entry of any stray solid particles that might be passed by the needle into the gas handling system. Filter 46 may comprise sintered metal, glass wool, fiberglass, cellulose, or the like. The upper end of capillary tube 44 is enlarged as at 48, and receives an upper rubber septum 50 formed of the same material as septum 40. If desired, upper portion 48 may be formed with threads, a sealing bead, or other suitable means to permit connection into any suitable gas collector and/or analyzer equipment, such as a vacuum pump or a chromatographic column, or other subsequent gas handling equipment. As shown, it is intended to utilize another hollow needle which may be inserted through septum 50 to collect the gasses collected through needle N. It will be understood that septum 50 may be remove and the entire apparatus evacuated or otherwise purged before sample collection. In the aforementioned successful embodiment of the invention, capillary tube 44 was copper and had an inside diameter of about 1/16 inch. It will be understood that the showing of FIG. 4 is out of scale for the sake of clarity.

Since the capillary tube is relatively thin and does not have sufficient structural strength to support itself over its length, a supporting tube 52 is nested over capillary tube 44 to add the additional required structural strength. The tube 52 is held in place on capillary 44 by any suitable means, such as compression type tube fittings, not shown.

While the invention has been described in detail above, it is to be understood that this detailed description is by way of example only, and the protection granted is to be limited only within the spirit of the invention.

I claim:

1. A method of taking soil gas samples comprising the steps of inserting a gas sampler into the earth until its lower end is at substantially the depth at which it is desired to sample gases, retracting said sampler a predetermined distance, whereby a solids-free space is created below the sampler, moving gas sampling means from a first position wherein said gas sampling means is located within said sampler to a second position wherein said gas sampling means is located in said solids-free space, collecting gases which may be present in said space via said gas sampling means, and wherein said step of moving gas sampling means from a first position wherein said gas sampling means is located within said sampler to a second position wherein said gas sampling means is located in said solids-free space is accomplished by puncturing a resealable septum at the lower end of said sampler with a hollow needle comprising a portion of said gas sampling means.

2. The method of claim 1, and creating a pilot hole terminating a predetermined distance above said depth, and wherein said step of inserting a gas sampler into the earth until its lower end is at substantially the depth at which it is desired to sample gases is accomplished by inserting said sampler into said pilot hole and by driving said gas sampler through the earth from the lower end of said pilot hole to said depth.

3. The method of claim 1, wherein said sampler is retracted a distance in the range of about one to about two inches.

4. The method of claim 1, wherein said step of inserting a gas sampler into the earth until its lower end is at substantially the depth at which it is desired to sample gases is accomplished by driving said sampler the entire distance to said depth.

5. The method of claim 1, moving said needle from said second position back to said first position through said resealable septum after said step of gas collection is completed, and withdrawing the sampler out of the earth, whereby said gas collection means is sealed from contact with fluids and solids during said step of withdrawing the sampler out of the earth.

6. In a soil gas sampler, the combination comprising an elongated hollow body member, a nosepiece at the lower end of said body member, gas sampling means moveable within said hollow body member, said gas sampling means comprising a hollow needle at its lower end and a capillary tube having its lower end joined to the upper end of said needle, a longitudinal opening formed in said nosepiece to slidingly receive said needle, and support means for said capillary tube comprising a supporting tube nested over said capillary tube.

7. The combination of claim 6, said nosepiece comprising a resealable septum at its lower end to seal the lower end of said longitudinal opening, whereby said needle will pierce said septum when said gas sampling means are moved in said body member to locate said needle outside of said body member and will reseal the lower end of said nosepiece when said gas sampling means are moved to retract said needle into said body member.

8. The combination of claim 6, filter means interposed between the upper end of said hollow needle and the lower end of said capillary tube.

9. The combination of claim 8, said filter means comprising sintered metal.

10. The combination of claim 6, said capillary tube being formed with means at its upper end adapted to connect the space within said capillary tube with gas sample handling equipment.

11. The combination of claim 10, said connection means comprising an enlarged portion at the upper end of said capillary tube above the upper end of said support tube and a resealable septum sealingly seated in said enlarged portion of said capillary tube.

12. The combination of claim 6, said hollow body member comprising a length of metal tube formed with external screw threads at its upper end, whereby said sampler may be protected at its upper end by a protective cap on said external screw threads.

13. The combination of claim 6, said hollow body member comprising a steel tube having a length in the range of about 6 feet to about 15 feet and an external diameter in the range of about 5/8 inch to about 1¼ inches.

References Cited

UNITED STATES PATENTS

| | | | |
|---|---|---|---|
| 2,141,261 | 12/1938 | Clark | 73—421.5 |
| 2,376,366 | 5/1945 | Lawlor et al. | 73—421.5 |
| 3,238,784 | 3/1966 | Dorsey et al. | 73—425 |
| 3,343,421 | 9/1967 | Miller | 73—421.5 |

LOUIS R. PRINCE, Primary Examiner

HARRY C. POST III, Assistant Examiner

U.S. Cl. X.R.

73—425.2